Oct. 13, 1936.   R. C. MOFFITT   2,057,158
DIFFERENTIAL PISTON CONNECTING LINKAGE
Filed March 25, 1935    2 Sheets-Sheet 1

INVENTOR
Robert C. Moffitt
BY
Smith & Tuck
ATTORNEYS

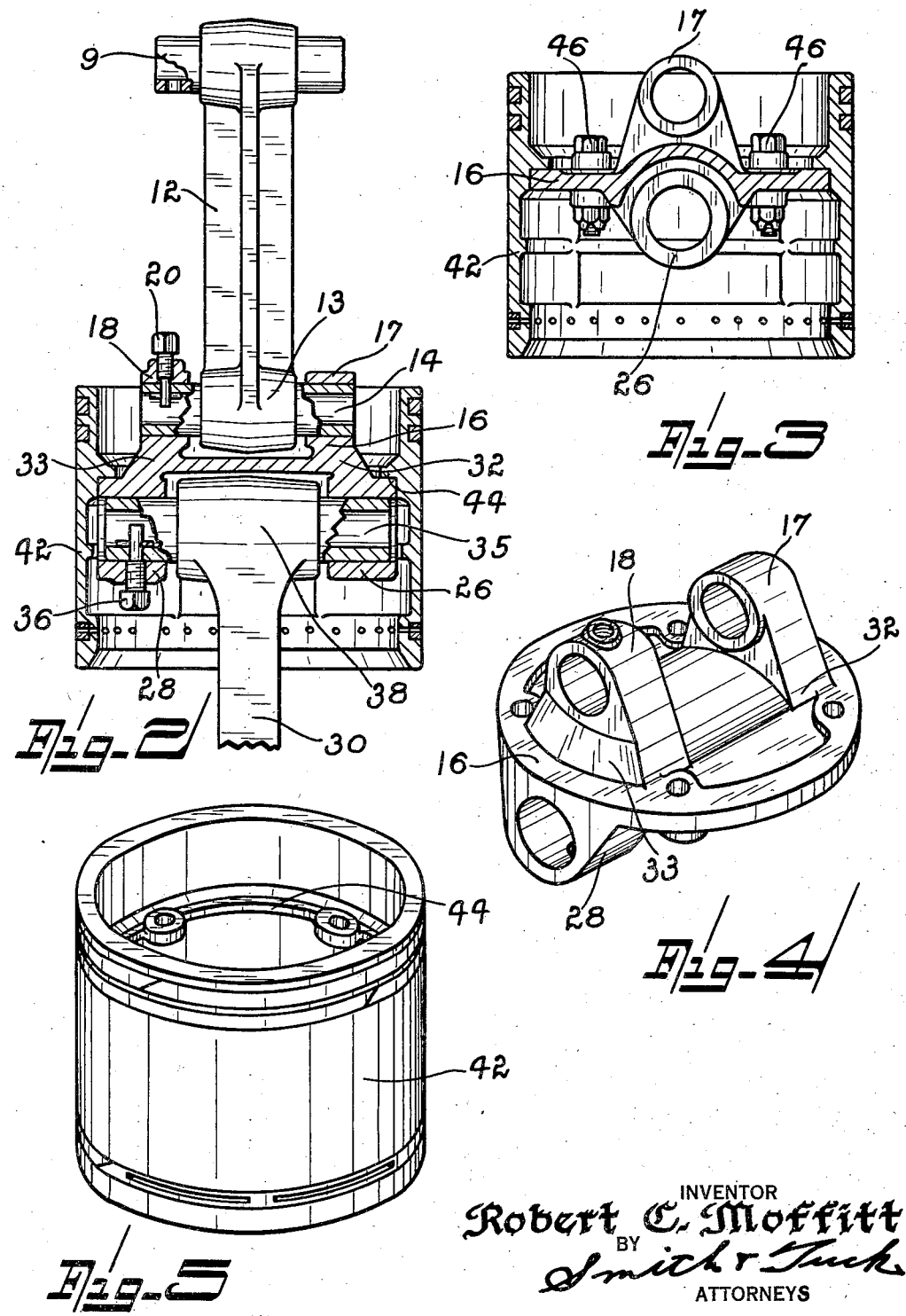

Patented Oct. 13, 1936

2,057,158

UNITED STATES PATENT OFFICE 2,057,158

DIFFERENTIAL PISTON CONNECTING LINKAGE

Robert C. Moffitt, Seattle, Wash.

Application March 25, 1935, Serial No. 12,989

6 Claims. (Cl. 309—4)

My present invention relates to the art of reciprocating piston assemblies and more particularly to a differential piston connecting linkage.

My invention relates more specifically to internal combustion engines, pumps and compressors of the differential piston or step piston type. In this type of machine two cylinder bores are provided of different diameters, normally on the same axis, and in the past it has been customary to provide either a single piston, having the two diameters required, machined thereon, or to have two separate pistons rigidly connected with a piston rod. With such assemblies considerable difficulty is encountered; it being very difficult to machine and assemble the two cylinders having exactly the same axis; this causes excessive mechanical friction and wear on both the cylinder walls and pistons. Secondly, where an attempt is made to use a single piston casting machined to the two required diameters, the piston becomes excessively long and in operation is subjected to unequal temperature stresses, between its upper and lower limits which result in distortion and misalignment thereby creating further mechanical friction losses, excessive piston and cylinder wall wear and undesired leakage past the piston. This action is particularly true, where, in order to reduce the reciprocating mass, the piston is made of light sections. The one piece piston is complicated in design with its attendant difficult and costly casting and machine work. Further, in engines, pumps or compressors operating under high pressure the lower piston must be sufficiently heavy and amply bossed to carry the required connecting rod cross head pin and to be able to dissipate the side thrust stresses when the piston assembly is under load. In my present arrangement these difficulties are either corrected or eliminated and, in addition, many other desirable features are gained.

My present assembly consists of an upper piston of more or less conventional design, having a piston pin to which is secured a connecting link. The connecting link in turn is pivotably and sidably secured in a partition coupling plate. This coupling plate is provided with bosses for securing the cross head pin, to which is pivotably secured, in the conventional manner, the main connecting rod of the engine, which in turn engages the crank shaft. The lower, pump or cross head piston is fixedly secured to the partition coupling plate.

This general arrangement overcomes the difficulties enumerated above and provides the following objects of my present invention:

First it simplifies design, casting, forging, machining and assembly, and eliminates error in work that would necessitate the rejection of a costly and complicated one-piece piston or cylinder wall casting.

Secondly, in event of failure in operation or wear therefrom, smaller and less expensive parts can be used for replacement instead of complete piston assemblies.

Thirdly, the lower or pump piston is not subjected to the compression stresses of the main power load.

Fourthly, the main power thrust is transmitted from the upper, or power piston, in practically a straight line. Side wall thrust wear of the upper piston is practically eliminated with the corresponding improvements in lubrication which, in turn, results in longer life and reduction of mechanical frictional losses.

Other and more specific objects will be apparent from the following description taken in connection with the accompanying drawings, wherein Figure 1 is a vertical cross-sectional view through an engine incorporating my self-aligning piston connecting linkage.

Figure 2 is a fragmentary view showing, in section, the lower, or pump piston, together with the partition coupling plate.

Figure 3 is a cross-sectional view through the pump piston taken at right angles to the view of Figure 2.

Figure 4 illustrates, in perspective, the partition coupling plate.

Figure 5 illustrates, in perspective, the lower or pump piston.

Figure 1:
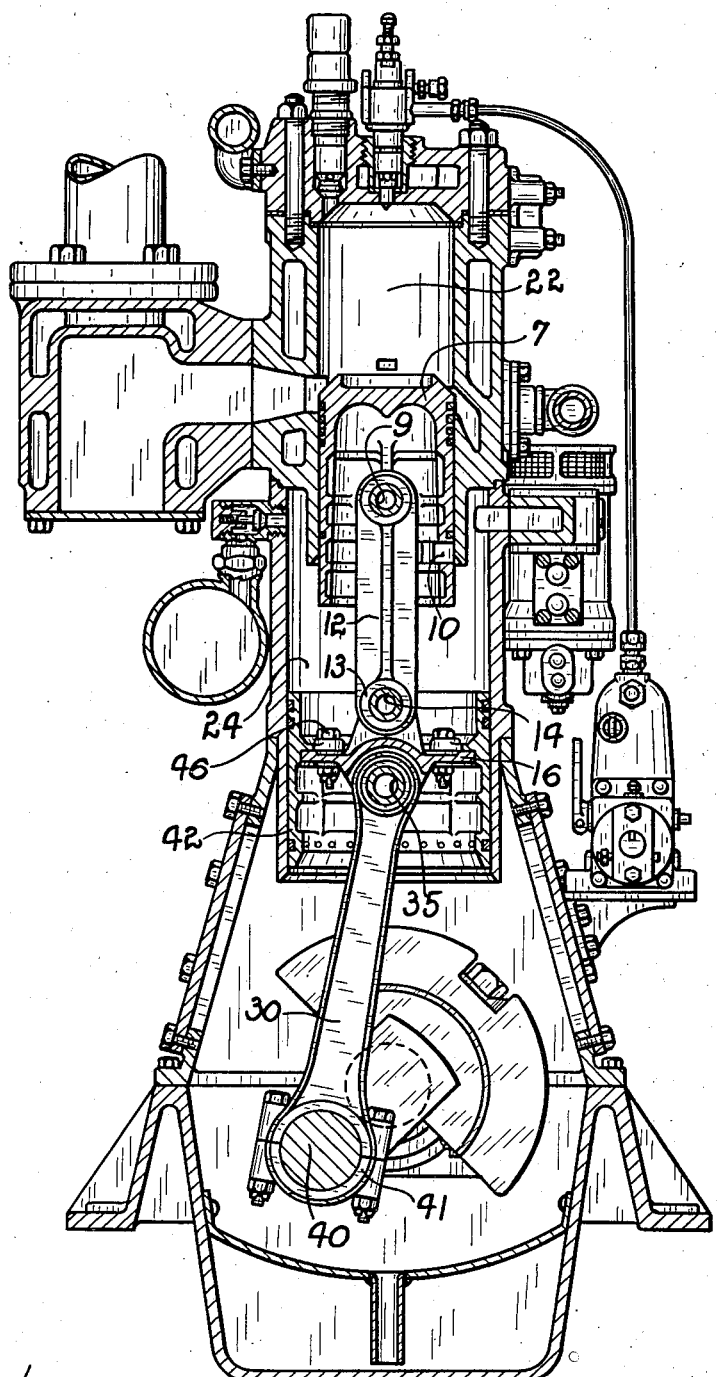

Referring to the drawings, throughout which like reference characters indicate like parts, 7 designates the upper or power piston. This piston should follow conventions of design applicable to the operating condition and fuel injection plan that the engine is designed to work under. In the present showing the power piston has been shown as a fairly long trunk type, having the usual piston pin bosses adapted to accommodate the piston pin 9. It is desired to point out at this time, however, that the relatively long piston indicated is required only because of the cycle of operation employed in the drawings which involves the piston port 10. If the cycle did not require the ported piston the same could be quite short as it is subject to practically no side thrust and need actually only be of sufficient length to adequately house the piston rings and provide such port coverages as may be required.

Pivotably mounted upon pin 9 which I prefer to secure within the piston, is the intermediate connecting link, or rod, 12. This member is provided at its lower end with a boss 13 adapted to encircle the connecting link wrist pin 14.

Pin 14 is preferably fixedly secured, within the partition coupling plate 16 as by bosses 17 and 18, with a suitable locking screw 20. Attention is invited to the fact that the clearance between bosses 17 and 18 should be substantially greater than the overall length of boss 13 so that rod 12 can slide endwise on pin 14 to take care of any misalignment between the upper or power cylinder 22 and the lower or pump cylinder 24.

Disposed on the lower surface of plate 16 are spaced bosses 26 and 28. These bosses are substantially under bosses 17 and 18 respectively so that the transfer of the power thrust from the upper rod 12 to the main connecting rod 30 is carried through the relatively short metal pillars 32 and 33, respectively, thus permitting the transfer of the power effort through members which, while having adequate strength, are so favorably positioned that they need not be excessively heavy to accomplish their purpose with safety.

Fixedly secured within bosses 26 and 28 is the cross-head pin 35. This is secured in position as by the set screw 36. As in the case of pin 14 the spacing of bosses 26 and 28 should be sufficiently far apart so as to provide for reasonable movement of boss 38, of rod 30, to again take care of any misalignment between the bore of cylinder 24 and the position of the crank throw to which the connecting rod 30 is secured. The crank shaft 40 can be of any desired conventional design but with the arrangement provided for taking care of misalignment, the only end freedom required for the crank pin bearing 41 is just sufficient for ordinary running clearance.

Secured to the partition coupling plate 16 is a pump piston 42. This piston is substantially an unbroken tube having an annular ledge 44 which is machined to engage the upper surface of plate 16 and the two are held in fixed relationship by a plurality of through bolts 46. Piston 42 is provided with piston rings of suitable design which have the dual purpose of retaining the low pressure air that this piston is required to handle and further to prevent the pumping of oil up into cylinder 24 where it might in turn pass on into the firing chamber and thus interfere with the operation and control of the engine. In addition to its function as a pump piston as indicated, piston 42 has the further purpose of transmitting the side thrust of the power load, occasioned by the angularity of rod 30, during the power stroke, to the cylinder walls of cylinder 24. It is in an ideal condition however, to handle this load as it is working in an area well removed from any heat of combustion. It is preferable to form cylinder 24 in a separate casting from the power cylinder, as is indicated in Figure 1. Necessity further provides that it have increased diameter over piston 7 so that the actual side wall pressure, per unit of area, created during the power stroke is but a fraction of that usually imposed upon a trunk piston. A further advantage enjoyed by piston 42 is that owing to the fact that the partition plate 16, which can be made of a forging, carries the downward thrust from the power piston to the main connecting rod 30, the piston can be of fairly light construction—it need merely be heavy enough to take care of the side thrust. This is a very desirable characteristic of my present construction in that it admits of lighter construction than might normally be possible and which is so desirable in any reciprocable mass that might tend to effect the maximum speed of operation of an engine. The down piston, further, never suffers the distortion often caused when piston pins are driven into position.

*Method of operation*

In the present showing I have indicated my linkage and piston arrangement as used in a two cycle engine; as shown it will serve in either a Diesel or gas engine, air compression or fluid pump. The cycle of operation in the present two-stroke engine arrangement, is such that when the power stroke occurs the downward thrust on piston 7 is communicated through link 12 to the partition coupling plate 16. Piston 7 is thus relieved of all side thrust and by having link 12 pivotably connecting the partition plate and piston 7, and further, by having it so arranged that rod 12 can slide longitudinally in the direction of the crank shaft plane and be free to pivot transversely thereto, no binding or undue stress can be set up within the piston nor can either piston unduly affect the other piston. The thrust thus transmitted to the coupling plate 16 is there divided into side thrust which is dissipated through piston 42 to the walls of cylinder 24 and to downward or working thrust which, through connecting rod 30, is transmitted to the crank shaft 40. With this arrangement many worth-while functions are incorporated. First of all the assembly can be reduced to the minimum in weight so that reciprocating masses may be correspondingly reduced, then, as wear might occur in the lower piston due to side thrust, the securing bolts 46 can be removed and the pump piston revolved until the holes re-engage in a different angular position. Another desirable feature is the fact that the two lower pins 14 and 35 are fully enclosed by piston 42 and though they became loose, they could not score the cylinder wall 24. Another feature that is very desirable in the operation of a Diesel engine is complete isolation of the crank case from the power piston. This is provided by the sealing rings of piston 42 and the partition coupling plate 16 which completely retains the oil vapor within the crank case itself. This keeps the lubricating oil entirely separated from the hot working surfaces of the engine and thus minimizes the formation of carbon and greatly reduces lubricating oil consumption.

Another very desirable feature of design in internal combustion engines is made possible with this construction, namely, having the upper power cylinder 22 made as a separate unit from the pump cylinder unit 24 so that suitable metal can be used in each unit and when through accident or wear one of the units needs replacement it does not require the expensive replacement of the entire unit. The self-alignment feature of the linkage is very desirable in this instance as it takes up any discrepancies that might occur in the positive matching up of a plurality of cylinder openings in the two castings. It is a well known fact that it is very difficult indeed to bore out a plurality of parallel holes and have them to exact dimensions. It can only be done under conditions of precision machine work and that is expensive. With my present construction any reasonable variation in dimension can be compensated for without in any way affecting the lasting qualities or workability of the engine.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. In a piston and link connection, the combination of a pair of separated, spaced, co-axial hollow pistons, a transversely arranged interior coupling plate rigid with one of the pistons forming a head therein, and a link pivotally connecting said plate with the other piston.

2. In a piston and link connection, the combination of a pair of hollow, separated, co-axially spaced pistons, an interior annular flange on one of the pistons, a transversely arranged plate bolted to said flange and forming a head in the piston, and a link pivotally connecting said plate with the other piston.

3. In a piston and link connection, the combination with a piston and a link pivotally connected thereto, of a plate forming a head and pivotally connected at the lower end of said link, a hollow piston enclosing said head, interior fastening bosses in the hollow piston, and bolts fastening said plate to said bosses.

4. In a piston and link connection, the combination with an upper hollow piston and a link pivoted therein, of a plate forming a head and pivotally connected with the lower end of the link, a lower hollow piston enclosing said head, said lower piston having an interior annular flange seated on the edge of the plate, fastening bosses integral with the flange, and bolts fastening said bosses to the head.

5. In a piston and link connection, the combination of a pair of separated, spaced co-axially alined hollow pistons, a rotatively adjustable coupling plate forming the head of one piston and providing separated spaces therein, means for rigidly securing said plate in the latter piston, and a link pivotally connecting said plate with the other piston.

6. In a piston and link connection, the combination of a pair of spaced, co-axially alined hollow pistons, a transversely arranged coupling plate rigid with the lower piston and separating said piston into upper and lower spaces, a journal bearing rigid with the upper side of the plate, and a link pivotally connecting the journal bearing with the upper piston.

ROBERT C. MOFFITT.